United States Patent [19]

Hegler et al.

[11] Patent Number: 4,779,651
[45] Date of Patent: Oct. 25, 1988

[54] PLASTIC CORRUGATED TUBE WITH INTEGRALLY MOLDED SLEEVE COUPLER

[75] Inventors: Wilhelm Hegler, Goethestrasse 2, D-8730, Bad Kissingen; Ralph-Peter Hegler, Bad Kissingen, both of Fed. Rep. of Germany

[73] Assignee: Wilhelm Hegler, Bad Kissingen, Fed. Rep. of Germany

[21] Appl. No.: 8,584

[22] Filed: Jan. 29, 1987

[30] Foreign Application Priority Data

Feb. 5, 1986 [DE] Fed. Rep. of Germany ....... 3603481

[51] Int. Cl.$^4$ ............................................. F16L 9/12
[52] U.S. Cl. ................................... 138/109; 285/903
[58] Field of Search ............... 138/121, 122, 109, 153, 138/140, 155, 173; 285/138, 139, 332, 332.1, 332.4, 417, 418, 903

[56] References Cited

U.S. PATENT DOCUMENTS

| 3,897,090 | 7/1975 | Maroschak | 285/903 X |
| 4,303,104 | 12/1981 | Hegler et al. | 138/173 X |
| 4,362,187 | 12/1982 | Harris et al. | 285/903 X |
| 4,487,232 | 12/1984 | Karao | 138/173 X |
| 4,611,636 | 9/1986 | Karao | 138/173 X |

FOREIGN PATENT DOCUMENTS

| 964310 | 3/1975 | Canada | 285/903 |
| 2100952 | 7/1972 | Fed. Rep. of Germany | 138/173 |
| 2906317 | 8/1979 | Fed. Rep. of Germany | 285/903 |
| 19795 | of 1895 | United Kingdom | 138/173 |
| 21867 | of 1899 | United Kingdom | 138/173 |
| 213191 | of 1900 | United Kingdom | 138/173 |

Primary Examiner—Mark J. Thronson
Attorney, Agent, or Firm—Browdy and Neimark

[57] ABSTRACT

A plastic corrugated tube, in the outer wall of which has a circular ring corrugation, is provided on one end with an integrally molded-on plain coupler having an approximately cylindrical inner face. Its inside diameter (d) is substantially equal to the outside diameter (d) of the corrugated tube, and the circular rings that form the corrugation and are spaced apart from one another by the distance (T) in the longitudinal direction of the tube each have the approximate cross section of a trapezoid tapering toward the outside; to this end, they have an approximately annular-cylindrical outer wall section (a) and slightly inclined side wall sections adjoining the outer wall section. To enable simple laying of the tubes by inserting the tube end into a sleeve coupler even when there are relatively large tolerances in diameter and in particular in the outer diameter of the tubes, yet simultaneously to attain a tight coupler union, at least a portion of the outer wall sections of the circular rings is provided with an annular elevation that can be elastically deformed radially inwardly in common with the respective outer wall section. The outside diameter (D) of the elevation, in the undeformed state, is slightly greater than the inside diameter (d) of the sleeve coupler.

7 Claims, 2 Drawing Sheets

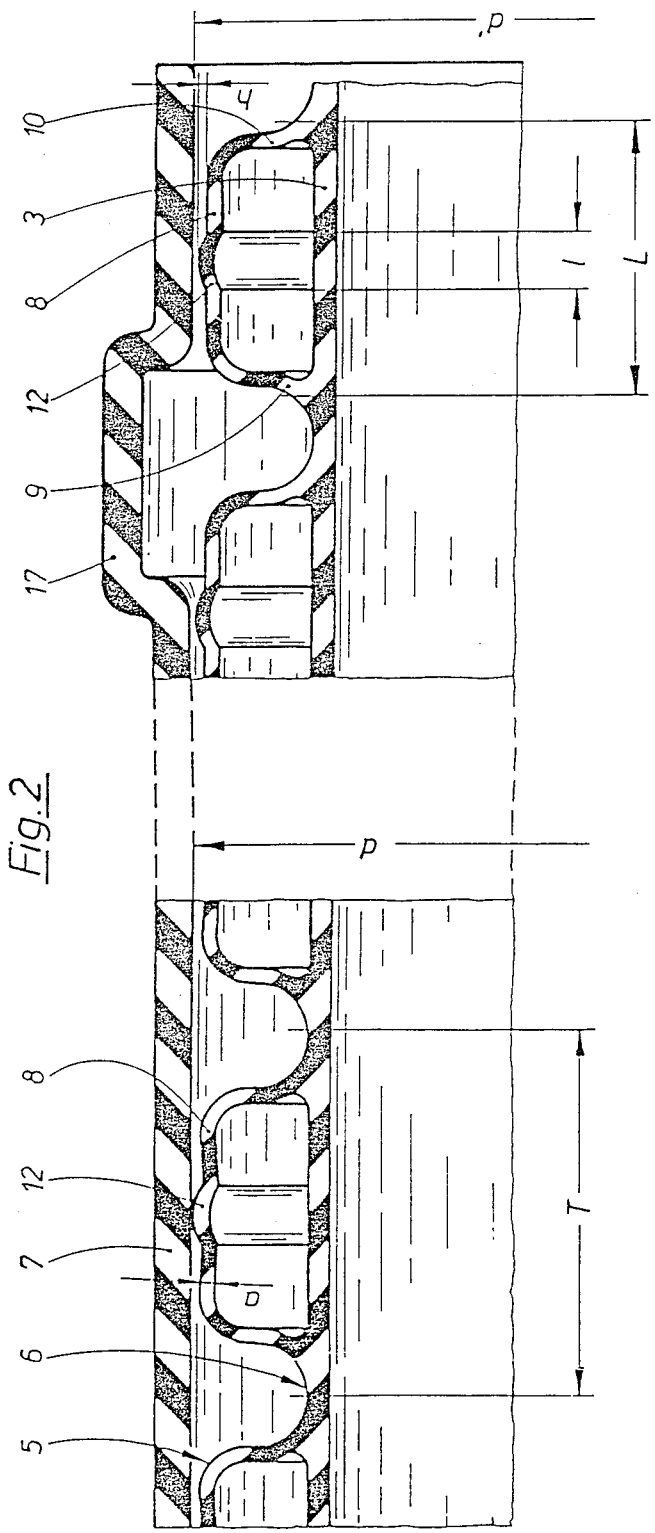

PLASTIC CORRUGATED TUBE WITH INTEGRALLY MOLDED SLEEVE COUPLER

FIELD OF THE INVENTION

The present invention relates to a plastic doublewalled corrugated tube.

BACKGROUND OF THE INVENTION

The structure of plastic corrugated tubes, particularly double-walled tubes with a continuous smooth inner wall, and the apparatus required for manufacturing them are well known (see as disclosed in U.S. Pat. Nos. 3,677,676, 3,994,646, and 3,280,430).

From European patent application EP-OS No. 0 135 634 (corresponding to U.S. patent application Ser. No. 532,857), it is already known to integrally mold on sleeve couplers in order to prepare such plastic corrugated tubes. The fundamental problem in laying such tubes is the relatively wide tolerance in terms of the outer diameter of the circular rings. As a result, laying of such a tube, that is introducing one end of the tube into a sleeve coupler is either completely impossible or possible only at great expense for assembly, while in another instance an adequately firm seat of the end of the tube in the sleeve coupler is not assured.

SUMMARY OF THE INVENTION

It is therefore the object of the present invention to provide plastic corrugated tubes of the above type such that even with relatively large tolerances in diameter, and especially in the outer diameter of the tubes, simple laying of the tubes is possible by inserting the tube end into a sleeve coupler, at the same time attaining a tight connection of the coupler.

This object is attained in accordance with the present invention by providing a plastic corrugated tube having circular rings forming the corrugation wherein at least a portion of the outer wall sections of the circular rings is provided with an annular elevation in the form of a bead which is radially inwardly elastically deformable in common with the respective outer wall section, the outside diameter of the elevation, in the undeformed state, being slightly greater than the inside diameter of the sleeve coupler. The essence of the invention is that only the annular elevation embodied on the outer wall section of a circular ring comes to rest on the inner wall of a sleeve coupler, and by means of the larger size of the outer diameter of the elevation as compared with the inner diameter of the sleeve coupler, it is assured that every annular elevation also in fact rests on the inner wall of the sleeve coupler. On the other hand, by embodying the particular circular ring as provided by the invention, it is possible for the entire circular ring to be radially elastically deformed inward, whenever the outer diameter of the annular elevation is greater than the inner diameter of the sleeve coupler. For one thing, the wall section can be pressed radially inward, and the side wall portions of the circular ring are also involved in the elastic deformation process. Since contact is attained only between the annular elevations and the inner wall of the sleeve coupler, simple insertion upon placement or laying of the tubes, or removal during disassembly, is possible. When there is to be adhesion between the corrugated tube and the sleeve coupler, the provisions according to the invention at the same time assure that two gaps remain between the inner wall of the sleeve coupler and the wall portion of the circular ring on either side of an annular elevation, and glue is located in these gaps and is not squeezed out when the tube end is inserted into the sleeve coupler. The provisions according to the invention are particularly advantageously usable in the above-mentioned double-walled tubes, in which the circular rings, because of the smooth inner tube integrally joined to them, are radially inherently rigid, while by the provisions according to the invention these circular rings are made elastically deformable. However, the provisions according to the invention are also advantageously applicable in plastic corrugated tubes that do not have an inner tube, such as those known from German Pat. No. 12 03 940.

In the corrugated tube of the present invention, for the outside diameter D of the elevated annular bead in the undeformed state of the circular ring, with respect to the inside diameter d of the sleeve coupler, the relationship $(D-2h) \leq d$ applies, here h is the radial extension of the annular elevation. This assures that the outer diameter of the circular rings without the annular elevations is smaller than the inner diameter of the sleeve coupler, so that undesirable seizing between the tube end and the sleeve coupler is reliably avoided.

By providing annular elevations or beads which have approximately the same or a slightly lesser thickness than the outside wall sections, it is assured that the particular circular ring is not reinforced in the vicinity of the annular elevation, which would mean that the effects attained by the invention would be diminished once again.

Where the radial extension h of the annular elevations with respect to the outside diameter D of the tube is in the relationship of $0.002 \leq h \leq 0.004$ D, it is assured that the range of tolerance in terms of the outer diameter is in fact encompassed by a corresponding radial extension of the annluar elevation.

Where the relationship of the axial extension l of the annular elevations with respect to the axial extension L of the circular rings is:

$$0.10 \, L \leq l \leq 0.35 \, L,$$

and wherein the axial extension of the annular elevations with respect to the thickness a of the outer wall sections is $$3a \leq l \leq 5a,$$

there is adequate radial elasticity in the vicinity of the annular elevations.

Where the sleeve coupler has, in the vicinity of its free end, an introduction portion widening conically, the outside diameter D of the annular elevations is slightly smaller than the inside diameter d' of the sleeve coupler at the free end of the introduction portion. This facilitates insertion of one end of the tube into a sleeve coupler, which in a known manner has a widening introduction portion in the vicinity of its free end.

From German Pat. No. 12 55 292, it is known to provide annular bulges on the outer circumference of smoothwalled, rigid plastic tubes having integrally molded-on sleeve couplers, the tubes or the couplers as well being reinforced in the vicinity of these bulges, because the inner wall of the tube or coupler is smooth in the longitudinal direction. These bulges originate in the annular recesses made in the manufacturing tools, with slits communicating with a vacuum terminating at these recessees. These circumferential bulges serve to increase the annular rigidity of the tubes, to lend the tubes additional support when they are being laid under plaster, and to prevent their being stretched lengthwise. At the same time, these bulges can act to provide sealing inside the coupler junction. In practical embodiments, the axial extension of these bulges was approximately 0.4 mm, while their radial extension was less than 0.1 mm. These known tubes having bulges were unable to provide any impetus in the direction of the invention.

Further advantages and characteristics of the invention will become apparent from the ensuing description of an exemplary embodiment, taken in conjunction with the drawings.

BRIEF DESCRIPTION OF THE DRAWINGS

FIG. 2 is a highly enlarged, interrupted fragmentary section from FIG. 1.

DESCRIPTION OF THE PREFERRED EMBODIMENT

Figure 1:
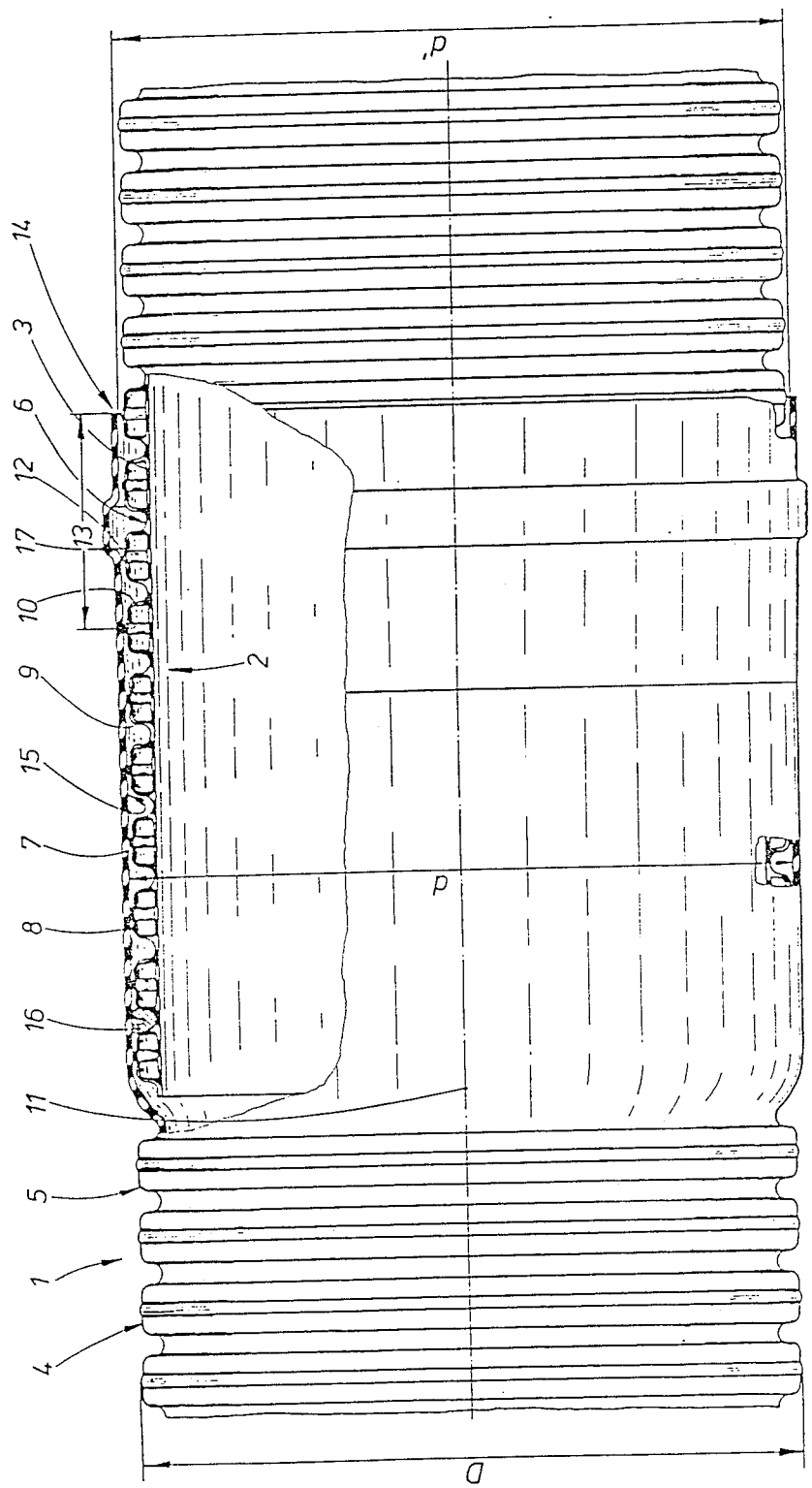
FIG. 1 shows a coupler union of two tubes, seen partly in longitudinal section.

In the interconnected tube sections 1, 2 shown in the drawing, the tubes are what is known as double-walled tubes. They each comprise one continuously cylindrical inner tube 3 and one corrugated outer tube 4. These tubes are manufactured in the manner disclosed in U.S. Pat. No. 3,677,676, where the union between the inner tube 3 and the outer tube 4 is effected when the still-warm plastic tubes that later form the inner tube 3 and outer tube 4 are united following the extrusion head. In the region between two adjacent circular rings 5 of the outer tube 4, that is in the vicinity of an indentation 6 between elevated portions of the corrugation, the inner tube 3 and outer tube 4 are in one piece with one another. A sleeve coupler 7 is molded onto one tube section 1, in which the warm plastic tubes forming the inner tube 3 and the outer tube 4 have been united during manufacture.

Each circular rings, as shown in the drawing, has the cross section of a trapezoid that tapers slightly toward the outside, this trapezoidal cross section being defined on the outside by an annular-cylindrical outer wall section 8 and laterally by two side wall sections 9, 10, which are inclined radially toward one another toward the outside, that is toward the outside with respect to the central longitudinal axis 11 of the tube section 1, 2. The base of the trapezoid is formed by the respective inner tube 3.

The outer wall section 8 is provided in each case with a flat elevation or bead 12 annularly surrounding it, which is shaped out of the outer wall section 8, and in other words has approximately the same thickness "a" as the outer wall section 8 and the side wall sections 9, 10. The extention or length of the elevation 12 in the direction of the axis 11 is the dimension "1". the extension or length of the circular ring 5 in the direction of the axis 11 is L. This dimension L is less than the interval T between the circular rings 5 of the respective tube section 1 or 2, these rings thus each extending from the center of one corrugation indentation 6 to the center of the next corrugation indentation 6. The outer diameter of the tube sections in the vicinity of the annular elevations 12 when the circular ring 5 is not deformed is D. The inside diameter of the plain coupler 7 is "d". The sleeve coupler 7 has a conically widening introduction section 13 in the vicinity of its open end, and the inside diameter d' of this introduction section 13 in the vicinity of the free end 14 is slightly larger than the outside diameter D of the elevations 12. For the radial extension "h" of the annular elevations 12 with respect to the outside diameter D of the respective tube sections 1, 2, the relationship is $0.002\,D \leq h \leq 0.004\,D$.

For the axial extension of the annular elevations or beads 12 with respect to the axial extension L of the circular rings 5, the relationship is $0.10L \leq 1 \leq 0.35L$.

For the axial extension of the annular elevations or beads 12 with respect to the thickness a of the outer wall sections 4, the relationship is $3a \leq 1 \leq 5a$.

Finally, for the outside diameter D of the annular elevations 12 in the undeformed state of the circular rings 5, with respect to the inside diameter d of the sleeve coupler 7, the relationship is $(D - 2h) \leq d$, where h is the radial extension of the annular elevation 12 above the outer wall section 8. For a typical tube with the typical width of 100, the following numerical values apply:

$D \approx 110$ mm
$d \approx 110$ mm
$T \approx 12$ mm
$l \approx 2.0$ mm
$h \approx 0.3$ mm
$a \approx 0.5$ to $0.6$ mm and
$L \approx 10$ mm As FIG. 1 shows, a sealing ring 16 may be introduced between two adjacent circular rings 5, resting on one side in the indentation 6 in the corrugations and on the other against the inner face 15 of the sleeve coupler 7 in a sealing manner. As a result, an additional sealing effect can be attained in a known manner.

As is particularly apparent from the left-hand side of FIG. 2, the circular rings 5 are deformed in the vicinity of the tubular section 2 that has been pushed into the plain coupler 7, in such a manner that the outer wall section 8, from which the annular elevation 12 has been molded out, is bent radially inward, so that in turn the annular elevation 12 is pressed elastically against the inner face 15 of the sleeve coupler. In contrast, the right-hand side of FIG. 2 shows the circular ring 5 in the undeformed state.

In the vicinity of its introduction portion 13, the sleeve coupler has an outer bead, which reinforces the annular rigidity. PVC (polyvinyl chloride) may be used as the material for the tubes.

What is claimed is:

1. A plastic corrugated tube having an inner wall and an outer wall, an outside diameter, and one end and another end;

said outer wall having a circular ring corrugation comprising a plurality of axially spaced circular rings;

an integrally-molded-on sleeve coupler on said one end, said molded-on sleeve coupler having an approximately cylindrical inner face having an inside diameter (d);

the inside diameter (d) of said inner face of said coupler being approximately equal to the outside diameter (D) of said corrugated tube;

said circular rings each having a cross section of an approximate trapezoid tapering toward the outside, formed by an approximately annular-cylindrical outer wall section and slightly inclined side wall sections adjoining the outer wall section;

wherein at least some of the annular-cylindrical outer wall sections of said circular rings are provided with an annular bead extending outwardly there-from and having an outside diameter and which is radially inwardly elastically deformable in common with the respective annularcylindrical outer wall section, the outside diameter of said annular bead, in the undeformed state, being slightly greater than the inside diameter (d) of said inner face of said sleeve coupler.

2. A corrugated tube according to claim 1 wherein the relationship $(D-2h) \leqq d$ applies, for the outside diameter (D) of the annular bead in an undeformed state of a circular ring, with respect to the inside diameter (d) of the inner face of said sleeve coupler, where h is the radial extension of the annular bead.

3. A corrugated tube according to claim 1 wherein the annular beads have approximately the same or a slighlty lesser thickness than said outer wall section.

4. A corrugated tube according to claim 1 wherein, for the radial extention (h) of the annular bead, with respect to the outside diameter (D) of the tube, the following relationship applies:

$$0.002\, D \leqq h \leqq 0.004\, D.$$

5. A corrugated tube according to claim 1 wherein, for the axial extension (l) of the annular beads, with respect to the axial extension (L) of the circular rings, the following relationship applies:

$$0.10\, L \leqq l \leqq 0.35\, L.$$

6. A corrugated tube according to claim 1 wherein for the axial extension (l) of the annular beads, with respect to the thickness (a) of the outer wall section, the following relationship applies:

$$3a \leqq l \leqq 5a.$$

7. A corrugated tube according to claim 1 wherein the sleeve coupler has a free end, and has in the vicinity of said free end an introduction portion having a free end, said introduction portion widening conically; wherein the outside diameter (D) of the annular beads is slightly smaller than the inside diameter (d') of said sleeve coupler at the free end of said introduction portion.

* * * * *